United States Patent
Senriuchi et al.

(10) Patent No.: US 8,461,807 B2
(45) Date of Patent: Jun. 11, 2013

(54) BATTERY PROTECTION CIRCUIT, METHOD FOR PROTECTING BATTERY, POWER SUPPLY DEVICE AND PROGRAM

(75) Inventors: Tadao Senriuchi, Tokyo (JP); Masahiko Hirokawa, Tokyo (JP); Takumi Sakamoto, Tokyo (JP); Hiroshi Nakazawa, Tokyo (JP); Noriyuki Hirao, Tokyo (JP)

(73) Assignees: TDK-Lambda Corporation, Tokyo (JP); TDK Corporation, Tokyo (JP)

( * ) Notice: Subject to any disclaimer, the term of this patent is extended or adjusted under 35 U.S.C. 154(b) by 211 days.

(21) Appl. No.: 12/659,948

(22) Filed: Mar. 25, 2010

(65) Prior Publication Data

US 2010/0259222 A1 Oct. 14, 2010

(30) Foreign Application Priority Data

Mar. 27, 2009 (JP) .................................. 2009-078346

(51) Int. Cl.
*H02J 7/00* (2006.01)
(52) U.S. Cl.
USPC ........................................................ 320/134
(58) Field of Classification Search
USPC .................................................. 320/134–136
See application file for complete search history.

(56) References Cited

U.S. PATENT DOCUMENTS

| 6,118,248 A * | 9/2000 | Gartstein et al. ............... 320/107 |
| 2007/0090792 A1 * | 4/2007 | Sim et al. ....................... 320/112 |
| 2009/0021217 A1 * | 1/2009 | Nakazawa et al. ............. 320/134 |

FOREIGN PATENT DOCUMENTS

JP B-3382002 12/2002

OTHER PUBLICATIONS

Complex Electronics Overview, available on Dec. 12, 2006 at http://www.hq.nasa.gov/office/codeq/software/ComplexElectronics/ce-overview.htm.*

* cited by examiner

*Primary Examiner* — Melissa Koval
*Assistant Examiner* — Daniel Miller
(74) *Attorney, Agent, or Firm* — Posz Law Group, PLC

(57) ABSTRACT

A reusable period of a battery can be maintained for a long time by recharging while avoiding abnormal heating of the battery due to over discharge. A battery protection circuit comprises a control part that cuts off a discharge switch which is a discharge path to a load for a battery when a voltage value of the battery is equal to or less than a first threshold value, or when the voltage value of the battery is less than the first threshold value, wherein the control part cuts off a power switch as a power supply path to the control part itself when the voltage value of the battery is equal to or less than a second threshold value, or when the voltage value of the battery is less than the second threshold value which is lower than the first threshold value.

9 Claims, 4 Drawing Sheets

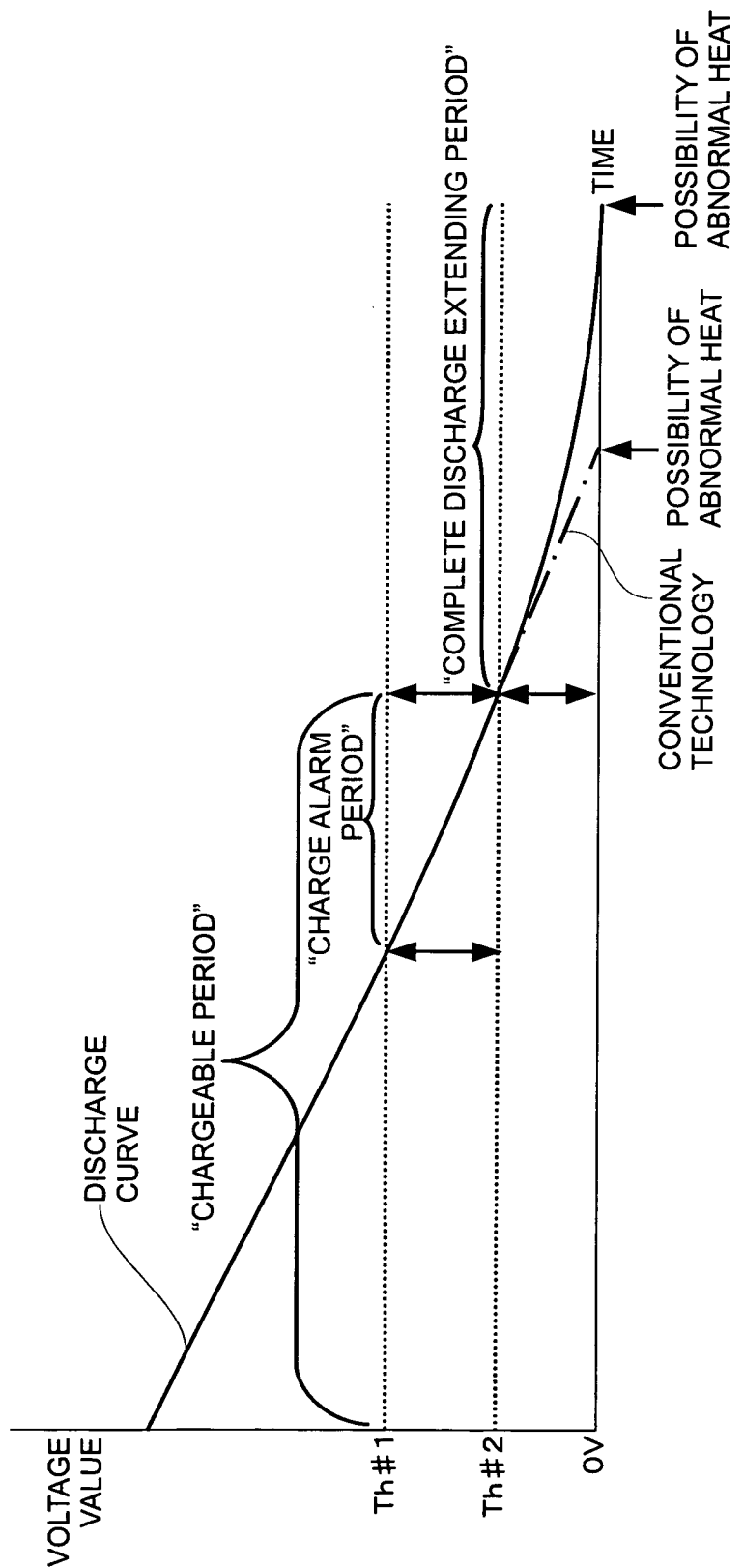

BATTERY PROTECTION CIRCUIT, METHOD FOR PROTECTING BATTERY, POWER SUPPLY DEVICE AND PROGRAM

CROSS-REFERENCE TO RELATED APPLICATION

The present application is related to, claims priority from and incorporates by reference Japanese patent application number 2009-078346, filed on Mar. 27, 2009.

BACKGROUND OF THE INVENTION

1. Field of the Invention

The present invention relates to a battery protection circuit, a method for protecting a battery, a power supply device, and a program thereof.

2. Description of Related Art

A battery protection circuit that protects against degradation of a battery caused by overcharge and over discharge of a power supply device with a built-in rechargeable secondary battery, such as a battery pack described in Japanese patent number 3382002 (hereafter patent reference 1), is widely known.

For example, the battery protection circuit described in patent reference 1 stops a battery from discharging immediately after (500 milliseconds) an alarm when over discharge of the battery progresses. Similarly, when overcharge of the battery progresses, charging of the battery is stopped immediately after the alarm.

In the battery protection circuit described in patent reference 1, when the overcharge or over discharge progresses, a discharge path or a charge path is cut off in order to protect the battery. At this time, when it is in an over discharge condition, the battery recovers from the over discharge condition through charging of the battery by a user and becomes reusable. On the other hand, when the user leaves an over discharge condition of the battery and does not recharge, over discharge further progresses. When the over discharge progresses, eventually, the battery is degraded until it is in a nonreusable condition.

When the battery is, for example, a lithium-ion battery, due to the over discharge, cobalt of a positive electrode is eluted, and copper of a collector of a negative electrode is eluted. As a result, the lithium-ion battery does not function as a secondary battery. Furthermore, it is well known that the over discharge of the lithium-ion battery could cause abnormal heating of the battery.

In contrast, the condition in which a user does not recharge even though the battery is in the over discharge condition is not assumed in the battery protection circuit of patent reference 1. In other words, the battery and an over discharge detecting part (or overcharge detecting part) are constantly connected to each other in the battery protection circuit of patent reference 1. Under this structure, the battery keeps supplying power with respect to the over discharge detecting part (or overcharge detecting part) even though the over discharge progresses up to the point in which the battery is nonreusable.

Accordingly, it is effective to extend a period of time to fall in a condition in which abnormal heating due to over discharge occurs by eliminating all of the elements that progress the over discharge in the over discharge detecting part (or overcharge detecting part) with respect to the battery which is in the nonreusable condition due to the over discharge.

SUMMARY OF THE INVENTION

The present invention is provided against the background discussed above. An object of the present invention is to provide a battery protection circuit, a method for protecting a battery, a power supply device, and a program that can maintain a long reusable period by recharging while avoiding abnormal heating of the battery due to the over discharge.

The first aspect of the present invention is a battery protection circuit which comprises: a control part that cuts off a discharge path to a load for a battery when a voltage value of the battery is equal to or less than a first threshold value, or when the voltage value of the battery is less than the first threshold value, wherein the control part cuts off a power supply path to the control part itself when the voltage value of the battery is equal to or less than a second threshold value, or when the voltage value of the battery is less than the second threshold value which is lower than the first threshold value.

In the battery protection circuit according to the present invention, it is preferable that the control part cuts off a charge path to the battery when the control part cuts off the power supply path to the control part itself.

The second aspect of the invention is a method for protecting a battery which is executed by a control part that cuts off a discharge path to a load of a battery when a voltage value of the battery is equal to or less than a first threshold value, or when voltage value of the battery is the less than the first threshold value, wherein the control part executes a step to cut off a power supply path to the control part itself when the voltage value of the battery is equal to or less than a second threshold value, or when the voltage value of the battery is less than the second threshold value which is lower than the first threshold value.

In the method for protecting the battery according to the present invention, it is preferable that a charge path to the battery is also cut off as a cut off processing step when the control part cuts off the power supply path to the control part itself.

The third aspect of the invention is a power supply device which comprises the battery protection circuit according to the present invention and a battery which is a subject of protection by the battery protection circuit.

The fourth aspect of the invention is a program that realizes a function of the battery protection circuit according to the present invention in an information processing device by being installed in the information processing device.

According to the present invention, a reusable period of a battery can be maintained for a long time by recharging while avoiding abnormal heating of the battery due to over discharge.

BRIEF DESCRIPTION OF THE DRAWINGS

FIG. 4 is an explanatory diagram of two threshold values of a control part shown in FIG. 2.

DETAILED DESCRIPTION OF THE PREFERRED EMBODIMENTS

[Regarding Structure of Power Supply Device 1 According to Embodiment of Present Invention]

Figure 1:
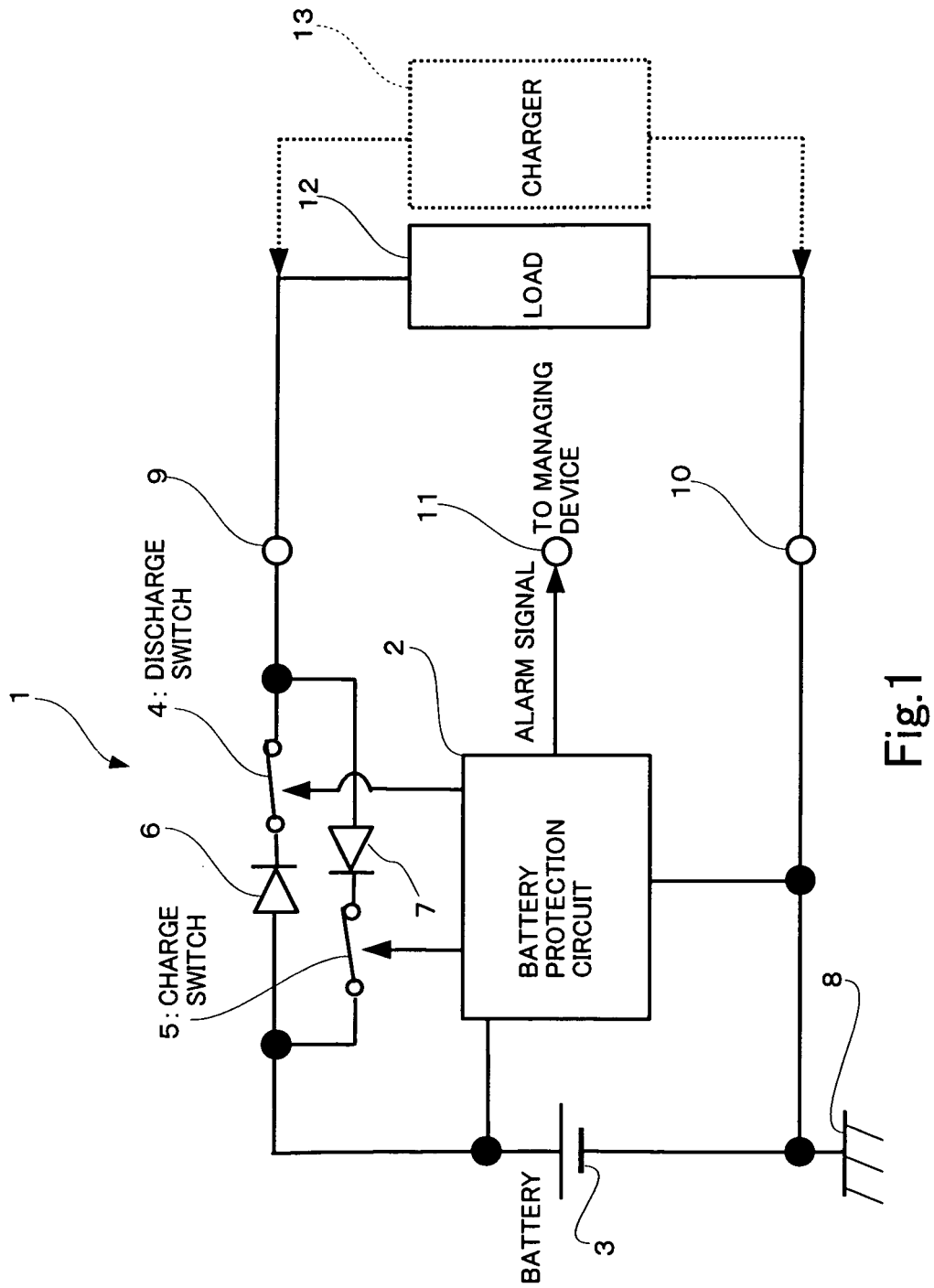
FIG. 1 is a schematic view of an overall structure for a power supply device according to an embodiment of the present invention.

As shown in FIG. 1, a power supply device 1 according to an embodiment of the present invention is configured with a battery protection circuit 2, a battery 3, a discharge switch 4, a charge switch 5, diodes 6 and 7, a ground potential line 8, terminals 9 and 10, an alarm terminal 11, and a load 12 or a charger 13. The power supply device 1 is, for example, configured as a battery pack which includes the battery 3.

A structure of the battery protection circuit 2 is explained later in detail by using FIG. 2. The battery 3 is, for example, a lithium-ion battery. The battery 3 may be configured with a plurality of cells even through the battery 3 is shown in the figures as a single cell. The discharge switch 4 turns ON (connected)/OFF (disconnected) power supplied from the battery 3 to the load 12. The charge switch 5 turns ON/OFF charging current supplied from the charger 13 to the battery 3. The diode 6 prevents reverse current from flowing from the load 12 to the battery 3. The diode 7 prevents reverse current from flowing from the battery 3 to the charger 13. The ground potential line 8 provides "0" (V) internally to the power supply device 1. The terminals 9 and 10 are connected to either the load 12 or the charger 13.

The alarm terminal 11 outputs an alarm signal from the battery protection circuit 2. For example, a managing device (not shown) of an administrator is connected to the alarm terminal 11. Or, when the load 12 has an input terminal (not shown) that receives the alarm signal of the battery protection circuit 2, the output of the alarm terminal 11 can be connected to the load 12. Note that both the discharge switch 4 and the charge switch 5 are normally in the turned ON condition. Even though the discharge switch 4 and the charge switch 5 are in the ON condition, the reverse current of the discharging current and charging current are blocked by diodes 6 and 7. The discharge switch 4 and the charge switch 5 are controlled to an OFF condition by the battery protection circuit 2 at the time of over discharge or overcharge.

Figure 2:
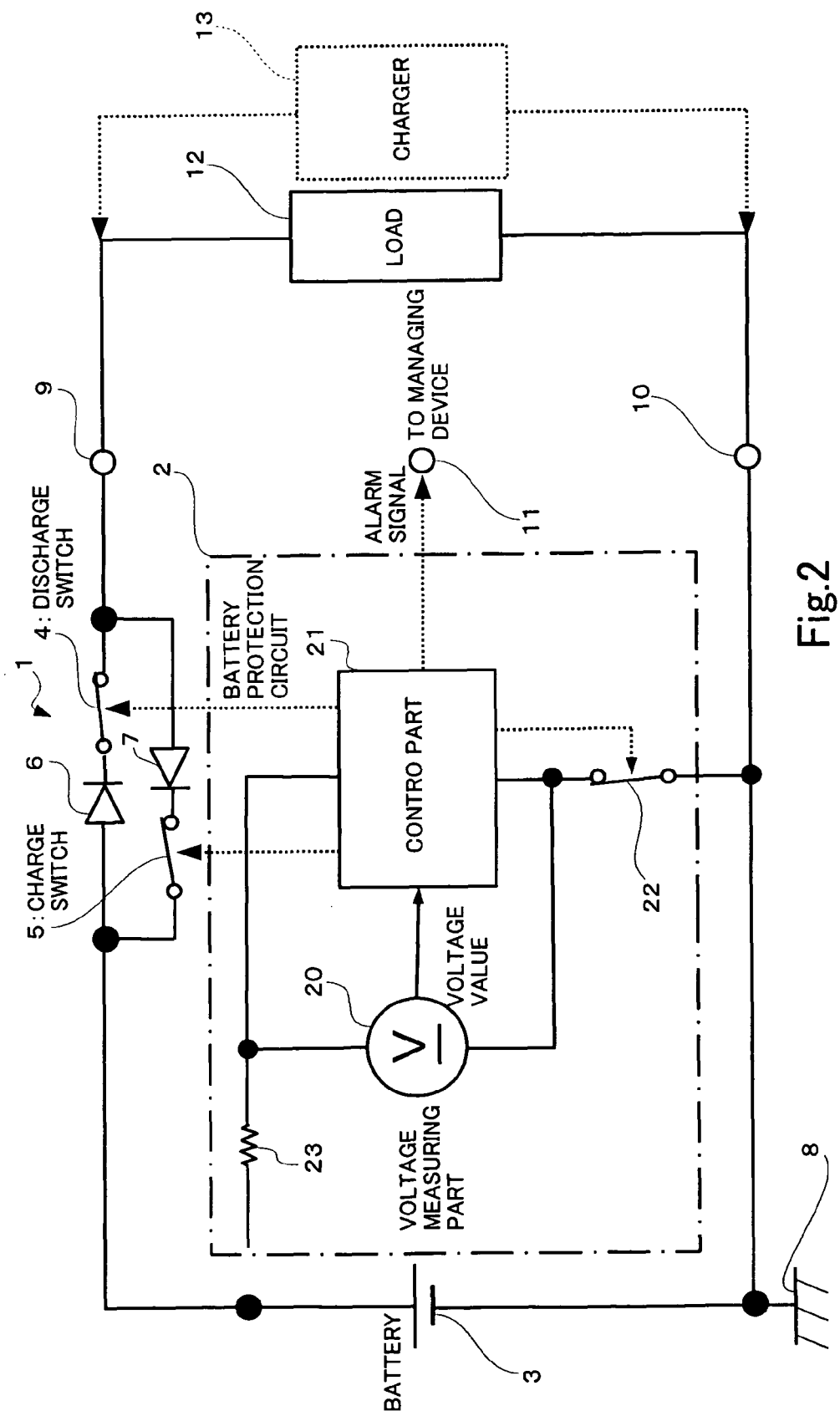
FIG. 2 is a schematic view of an internal structure of a battery protection circuit of the schematic view in the overall structure for a power supply device shown in FIG. 1.

The battery protection circuit 2 is configured with a voltage measuring part 20, a control part 21, a power switch 22, and a resistor 23 as shown in FIG. 2. The voltage measuring part 20 measures a voltage value of the battery 3 and outputs a signal to the control part 21. The control part 21 controls the turning ON/OFF of the charge switch 5, the turning ON/OFF of the power switch 22, and the turning ON/OFF of the discharge switch 4 depending on the voltage value output from the voltage measuring part 20. The control part 21 also controls an alarm output depending on the voltage value output from the voltage measuring part 20. The power switch 22 turns ON/OFF power supplied to the battery protection circuit 2. The resistor 23 has an extremely large resistance value compared to a resistance value of the load 12, and draws only a small part of current that is supplied to the load 12 by the battery 3 into the battery protection circuit 2.

[Regarding Operation of Control Part 21]

Operation of the control part 21 is explained with reference to the flow diagram in FIG. 3. Note that an explanation for charge control is omitted because it is the same as conventional technology, so that discharge control is primarily explained hereafter.

START: When the load 12 is connected to the power supply device 1, power is supplied from the battery 3 to the load 12. The control part 21 recognizes that the power supply to the load 12 from the battery 3 has started based on a change of a voltage value measured by the voltage measuring part 20, and shifts to the processing of S1.

S1: The control part 21 determines whether or not the voltage value measured by the voltage measuring part 20 is equal to or less than a threshold value Th#1. The control part 21 shifts to the processing of S3 when the voltage value measured by the voltage measuring part 20 is equal to or less than the threshold value Th#1 (YES at S1). On the other hand, the control part 21 shifts to the processing of S2 when the voltage value measured by the voltage measuring part 20 is more than the threshold value Th#1 (NO at S1).

S2: The control part 21 maintains the discharge switch 4 ON and returns to the processing of S1.

S3: The control part 21 not only turns the discharge switch 4 OFF but also outputs an alarm, and then shifts to the processing of S4.

S4: The control part 21 determines whether or not the voltage value measured by the voltage measuring part 20 is equal to or less than the threshold value Th#2. The control part 21 shifts to the processing of S5 when the voltage value measured by the voltage measuring part 20 is equal to or less than the threshold value Th#2 (YES at S4). On the other hand, the control part 21 returns to the processing of S1 when the voltage value measured by the voltage measuring part 20 is more than the threshold value Th#2 (NO at S4).

S5: The control part 21 not only turns the charge switch 5 OFF, but also turns the power switch 22 OFF, and then ends the processing (END).

FIG. 4 is an explanatory diagram of two threshold values, Th#1 and Th#2, of the control part 21. As shown in FIG. 4, two threshold values, Th#1 and Th#2, are provided in the control part 21 with respect to a discharge curve of the battery 3. For example, when the battery 3 is a lithium-ion battery, a maximum voltage value at the time of a full charge is approximately 4.1 V; the threshold value Th#1 is set at around 2.1 V; and the threshold value Th#2 is set at around 1.1 V.

As shown in FIG. 4, when the voltage value of the battery 3 is equal to or less than the threshold value Th#1, the discharge switch 4 is turned OFF, and a charge alarm is output to a user. At this time, because the battery protection circuit 2 is being operated, the battery 3 is chargeable by connecting the charger 13 to the terminals 9 and 10. A period discussed above is referred to as a "charge alarm period." In other words, just after completion of a full charge through the end point of the "charge alarm period" is referred to as a "chargeable period."

During the "charge alarm period," when a user does not charge, the voltage value of the battery 3 will be further decreased. When the voltage value of the battery 3 is equal to or less than the threshold value Th#2 in due time, and when there is a possibility that the voltage value becomes to the extent that it might cause degradation of the battery 3, the control part 21 turns the charge switch 5 and the power switch 22 OFF to cut the power supply to the control part 21 itself. Accordingly, charging to the battery 3 is no longer possible. However, a period until abnormal heating occurs due to completely discharging the battery 3 can be extended compared to the conventional technology (shown in dashed line form). The period from time in which the voltage value of the battery 3 is equal to or less than the threshold value Th#2 through the time in which the battery 3 is completely discharged is referred to as a "complete discharge extending period."

As discussed above, when the discharge condition of the battery 3 is lowered to the voltage value that could cause degradation of the battery 3, the progress of degradation of the battery 3 can be slowed by cutting off all of the discharge paths of the battery 3. And, when the period of time from when the voltage value of the battery 3 is equal to or less than the threshold value Th#2 through when the battery 3 is completely discharged is short as the "conventional technology" shown with the dashed line in FIG. 4, a value of the threshold value TH#2 has to be set as a higher value in view of safety. In other words, the threshold value Th#2 is set as 1.1 V in the control part 21; however, this value is required to be set as a higher value in the conventional technology.

In contrast, in the power supply device 1, because the "complete discharge extending period" is longer than the conventional technology, the threshold value Th#2 can be set as a lower value. As a result, the "charge alarm period" can be set longer so that the "chargeable period" can be set longer with respect to the battery 3.

[Other Embodiments]

The embodiments of the present invention can be modified in various ways so long as such variations are not to be regarded as a departure from the sprit and scope of the invention. For example, it is explained that the alarm output is output only at the "charge alarm period" shown in FIG. 4 and is stopped at the "complete discharge extending period." This is because, at the "complete discharge extending period," the power consumption is required to be none. Accordingly, when there are any alarm means in which power is not consumed, the alarm output can be continued since the voltage value of the battery 3 is equal to or less than the threshold value Th#1.

For example, as for the alarm means that does not consume power, an alarm output device with a display content retention type is contemplated. When an input signal is received for a short period of time, magnetic energy occurs on an electromagnet. As a result, the alarm output device mechanically switches the display content "from normal to alarm" by moving a piece of iron that is drawn by the magnetic energy as a trigger.

Figure 3:
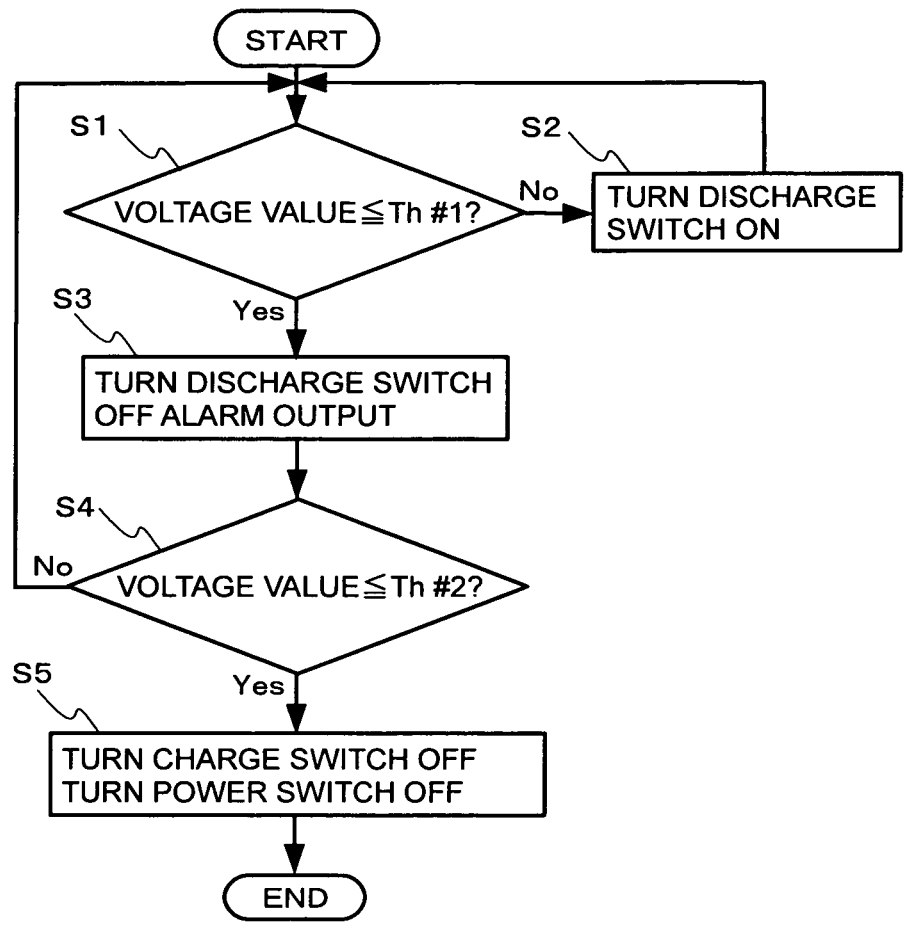
FIG. 3 is a flow diagram showing an operation order of a control part shown in FIG. 2.

Moreover, at the processing of Si in the flow diagram in FIG. 3, it is possible to substitute the determination processing of "the voltage value is less than the threshold value Th#1?" for "the voltage value is equal to or less than the threshold value Th#1?." Similarly, at the processing of S4 in the flow diagram in FIG. 3, it is possible to substitute the determination processing of "the voltage value is less than the threshold value Th#2?" for "the voltage value is equal to or less than the threshold value Th#2?"

The battery protection circuit, the method for protecting the battery, the power supply device, and the program being thus described, it will be apparent that the same may be varied in many ways. Such variations are not to be regarded as a departure from the sprit and scope of the invention, and all such modifications as would be apparent to one of ordinary skill in the art are intended to be included within the scope of the following claims.

What is claimed is:

1. A battery protection circuit comprising:
    a control part that is supplied with power from a battery,
    a first switch means that is controlled by the control part for cutting off a discharge path to a load for the battery when a voltage value of the battery is equal to or less than a first threshold value,
    a second switch means that is controlled by the control part for cutting off all power supplied from the battery to the control part when the voltage value of the battery is equal to or less than a second threshold value which is lower than the first threshold value; and
    a third switch means that is controlled by the control part for cutting off a charge path to the battery when the voltage value of the battery is equal to or less than the second threshold value.

2. A power supply device comprising the battery protection circuit according to claim 1 and the battery which is a subject of protection by the battery protection circuit.

3. The battery protection circuit according to claim 1, wherein the second threshold value is greater than 0V.

4. The battery protection circuit according to claim 1, further comprising an alarm, wherein the control part outputs an alarm signal to the alarm when a voltage value of the battery is equal to or less than the first threshold value.

5. A method for protecting a battery comprising executing steps by a control part, the steps comprising:
    connecting a discharge path to a load of a battery and a power supply path from the battery to the control part;
    discharging the load of the battery;
    cutting off the discharge path to the load of the battery when a voltage value of the battery is equal to or less than a first threshold value;
    cutting off all power supplied to the control part itself when the voltage value of the battery is equal to or less than a second threshold value which is lower than the first threshold value; and
    cutting off a charge path to the battery when the voltage value of the battery is equal to or less than the second threshold value.

6. The method for protecting the battery according to claim 5, wherein the second threshold value is greater than 0V.

7. A protection circuit for a battery, comprising:
    a voltage measuring part configured to measure voltage values of the battery;
    a discharge switch configured to open and close a discharge path to a load for the battery;
    a power switch configured to open and close a power supply path from the battery to a control part; and
    a charge switch configured to open and close a charge path to the battery, wherein
    the control part is configured to
        close the discharge switch, the power switch, and the charge switch,
        open the discharge switch in the discharge path to the load for the battery when a voltage value of the battery is equal to or less than a first threshold value,
        open the power switch in the power supply path from the battery to the control part, thereby cutting off all power supplied from the battery to the control part and inhibiting over discharging and heating of the battery when the voltage value of the battery is equal to or less than a second threshold value that is less than the first threshold value and is greater than zero, and
        open the charge switch in the charge path to the battery when the voltage value of the battery is equal to or less than the second threshold value and is greater than zero.

8. A power supply device comprising the battery protection circuit according to claim 7 and the battery that is protected by the battery protection circuit.

9. The battery protection circuit according to claim 7, further comprising an alarm, wherein the control part controls the alarm to output an alarm signal when the voltage value of the battery is equal to or less than the first threshold value.

* * * * *